United States Patent [19]

Arita et al.

[11] Patent Number: 4,843,537
[45] Date of Patent: Jun. 27, 1989

[54] CONTROL SYSTEM

[75] Inventors: Setsuo Arita, Hitachiota; Shunsuke Utena, Hitachi; Fumio Murata, Katsuta; Atomi Noguchi, Hitachi; Shigeru Izumi, Tokyo; Satoshi Suzuki, Mito; Fumiyasu Ookido, Hitachi, all of Japan

[73] Assignee: Hitachi, Ltd., Tokyo, Japan

[21] Appl. No.: 69,046

[22] Filed: Jul. 2, 1987

[30] Foreign Application Priority Data

Jul. 4, 1986 [JP] Japan .................. 61-156071
Jan. 14, 1987 [JP] Japan .................. 62-4834

[51] Int. Cl.⁴ .................. G21C 17/00; G06F 11/00
[52] U.S. Cl. .................. 364/187; 376/215; 376/245
[58] Field of Search .................. 364/184, 187; 371/14, 371/25, 36; 376/215, 216, 245, 259

[56] References Cited

U.S. PATENT DOCUMENTS

| 4,434,132 | 2/1984 | Cook .................. 376/215 |
| 4,664,870 | 5/1987 | Hager .................. 376/215 |
| 4,683,105 | 7/1987 | Hager .................. 376/215 |
| 4,687,623 | 8/1987 | Cook .................. 376/215 |
| 4,696,785 | 9/1987 | Cook et al. .................. 376/215 |
| 4,697,093 | 9/1987 | Sutherland et al. .................. 376/215 |
| 4,752,869 | 6/1988 | Miller et al. .................. 364/187 |

FOREIGN PATENT DOCUMENTS 0180085 5/1986 European Pat. Off. .......... 376/215

Primary Examiner—Allen MacDonald
Attorney, Agent, or Firm—Antonelli, Terry & Wands

[57] ABSTRACT

A safety control safeguard system includes sensors disposed in a quadruple array. First, second, third and fourth signal processing channels provided in parallel each include signal processing means for receiving output signals from the associated sensors for producing a trip signal. First and second actuating means operable independent of each other are provided for actuating an apparatus to be controlled. A first switch means operatively connected to the first, second, third and fourth processing channels for activating the first actuating means in response to reception of the trip signal produced by the signal processing channels and second switch means operatively connected to the first, second, third and fourth processing channels for activating the second actuating means in response to reception of the trip signal produced by the signal processing channels. The first and second switching means are operable independent of each other and constitute a 2-out-of-4 logic circuit in cooperation with the first and second actuating means.

18 Claims, 8 Drawing Sheets

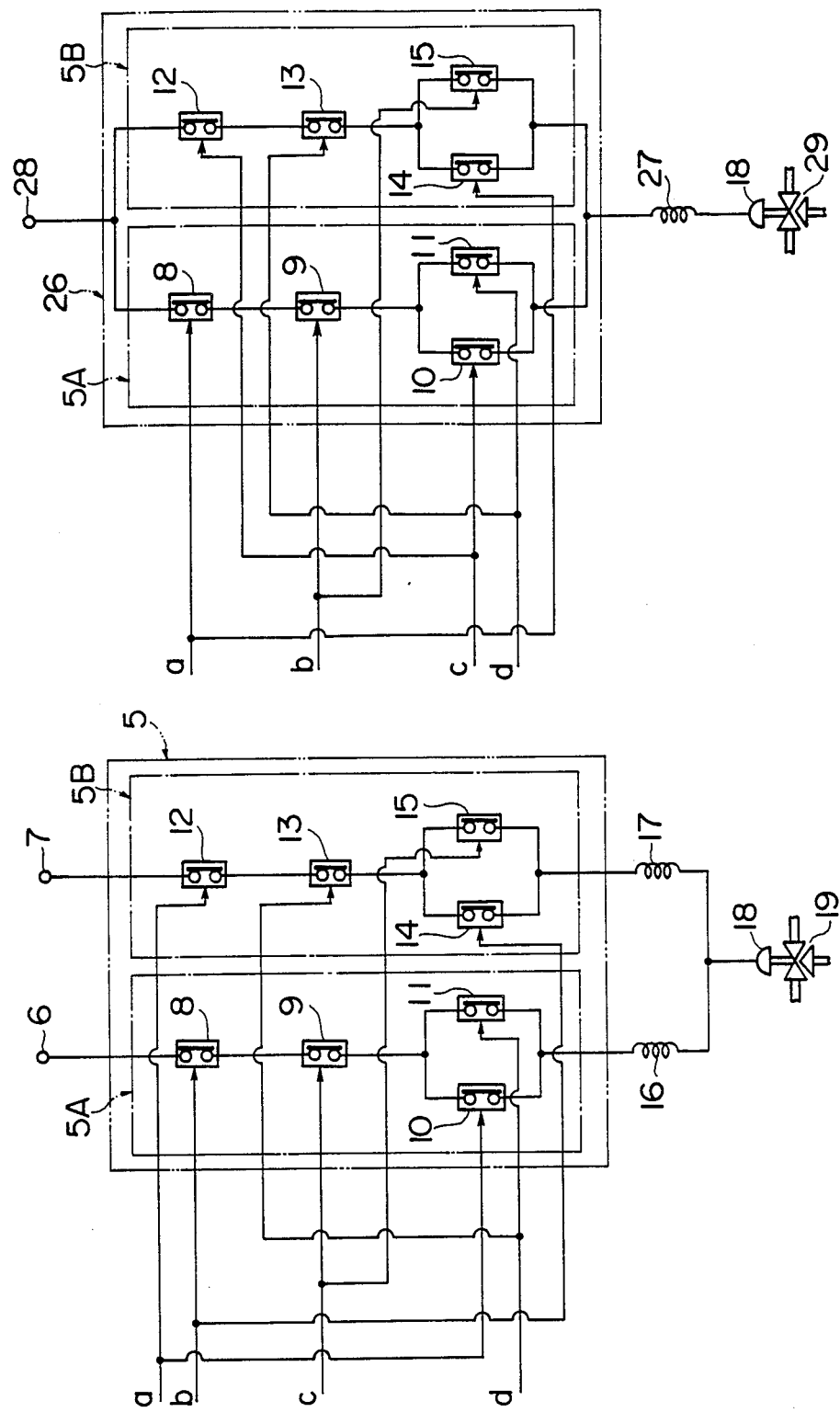

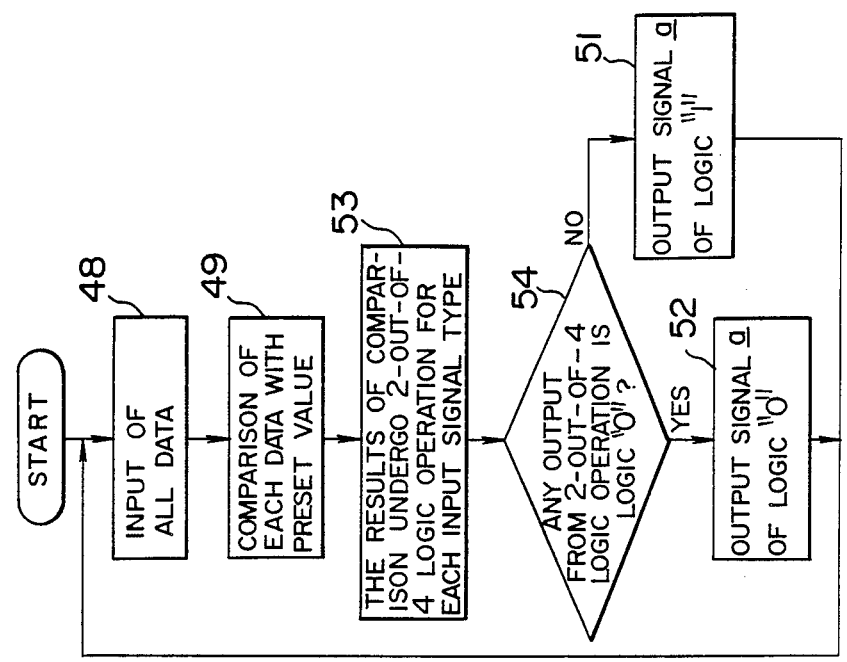
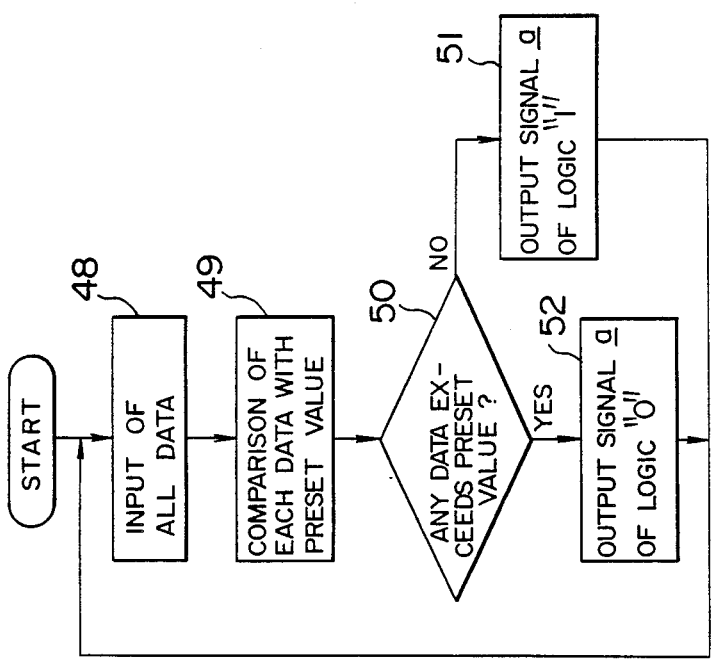

CONTROL SYSTEM

BACKGROUND OF THE INVENTION

The present invention generally relates to a safety control system such as for a nuclear power plant, and more particularly to a safety control system provided with two independent actuating means.

In nuclear power plants, it is a common practice to provide the plant with a safety and safeguard system for protecting the plant as well as a nuclear reactor against any possible abnormal transients and other unwanted phenomena for the purpose of assuring the safety of the nuclear reactor. By way of example, Japanese Laid-open Patent publication No. 118801/1986 (JP-A No. 61-118801) corresponding to U.S. Patent Application No. 666,696 filed Oct. 30, 1984 discloses a nuclear reactor safety and protection or safeguard system which includes sensors and channel signal processors connected in series, respectively, in a quadruple array and two logic circuits to which the outputs of the four channel signal processors are inputted. Each of the logic circuits is implemented in the form of two-out-of-four (2-out-of-4) voting logic circuit configuration, where one of the logic circuits is designed to produce a signal for activating a protecting system which can respond to the signal by opening a circuit breaker inserted in an electric power supply line leading to an electromagnetic device incorporated in a control rod controller unit to thereby scram the reactor, while the other logic circuit is designed to produce another safety system activating signal which brings about operation of an emergency borated water injection system and a spray system installed within a containment vessel of the reactor.

In connection with the 2-out-of-4 voting logic, typical examples thereof are found in a Japanese publication entitled "Nuclear Power Handbook", (1976), p.p. 263–267 and in particular on page 264, Table 9.6.

The aforementioned Japanese patent publication thus teaches the use of logic circuits implemented in the form of a 2-out-of-4 voting logic. However, no concrete circuit configuration of the 2-out-of-4 logic circuit is disclosed in this publication, although the abovementioned handbook shows in the Table 9.6 a typical example of the configuration of the 2-out-of-4 logic circuit.

More specifically, the Japanese Laid-open Patent Publication No. 118801/1986 concerns a safety control safegurd system for a pressurized water reactor (PWR). According to the safety control safeguard system for the reactor disclosed in this publication, one of the 2-out-of-4 logic circuits is utilized for activating the coil or solenoid incorporated in the control rod controller unit. In this conjunction, it is however noted that in the case of a control rod drive controller unit provided for assuring the safety of a boiling water reactor (BWR) known heretofore, the scramming electromagnetic valve for operating the controller unit is equipped with a pair of excitation coils. Consequently, according to the teachings disclosed in the Japanese patent publication mentioned above, the 2-out-of-4 logic circuit has to be provided for each of the excitation coils. For implementing the 2-out-of-4 logic circuit, the circuit configuration shown in the Table 9.6 on page 264 of the aforementioned handbook may be adopted.

Needless to say, when two independent manipulating or actuating means are provided for a single control system in concern (e.g. when two independent excitation coils are provided as in the case of the BWR), the two-out-of-four logic circuit has to be provided for each of the actuating means for activation thereof, which in turn means that the structure of the safety control safeguard system becomes very complicated, to disadvantage.

SUMMARY OF THE INVENTION

It is an object of the present invention to provide a control system of a simplified structure.

Another object of the present invention is to provide a control system which includes two-out-of-four logic circuits having no common mode therebetween and which can enjoy a significantly imroved reliability.

A further object of the present invention is to provide a control system in which a status signal processor or maintenance signal processor which suffers an abnormality can be easily disconnected.

In view of the above objects, there is provided according to an aspect of the present invention a control system which comprises sensors disposed in a quadruple array, first, second, third and fourth signal processing channels disposed in parallel and each including signal processing means having an input supplied with an output signal from the associated sensor, two independent actuating means, an apparatus whose operation is controlled by the actuating means, and switch means communicated with the first, second, and third and fourth signal processing channels for activiating operation of the two independent actuating means in response to the inputting of a trip signal produced in response to at least two outputs of the signal processing channels.

By virtue of the inventive arrangement in which the switch means for the control system is so arranged as to operate the two independent actuating means in response to the trip signals produced from at least two of four signal processing channels and constitutes in cooperation with the two actuating means a two-out-of-four logic circuit, the system structure can be significantly simplified.

BRIEF DESCRIPTION OF THE DRAWINGS

FIGS. 3, 4, 5, 6 and 7 are views showing other embodiments of the safety control safeguard system according to the present invention;

FIG. 11 is a view for illustrating processing procedure executed by the signal processor shown in FIG. 10; and FIG. 12 is a view for illustrating another processing procedure corresponding to a version of the procedure illustrated in FIG. 11.

DESCRIPTION OF THE PREFERRED EMBODIMENTS

Now, referring to the accompanying drawings, the control safeguard system according to the invention will be described in detail in conjunction with the preferred or exemplary embodiments on the assumption that the invention is applied to the safety control for a nuclear reactor plant.

Figure 1:
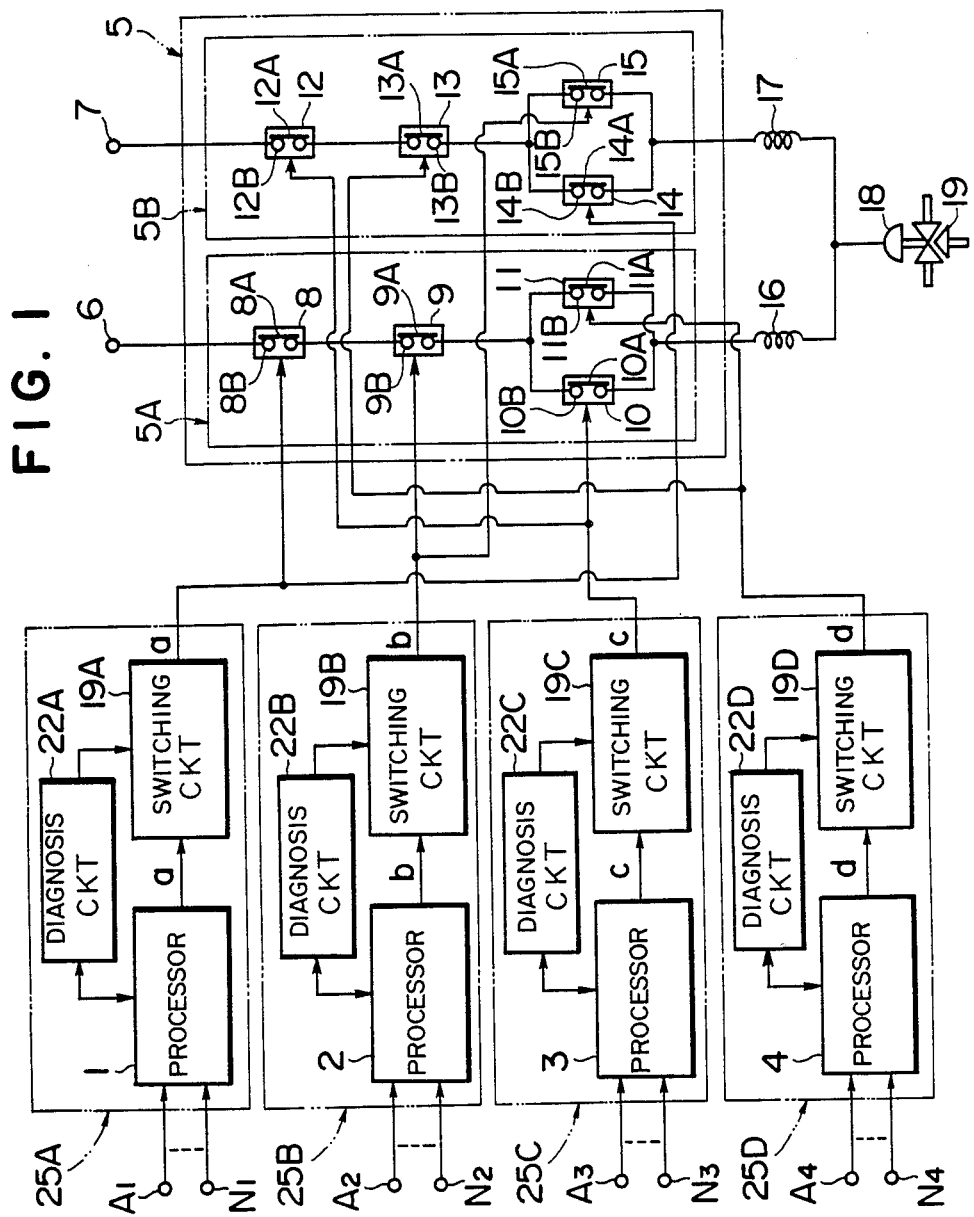
FIG. 1 is a view showing a general arrangement of a safety control safeguard system according to a preferred embodiment of the present invention.
Figure 2:
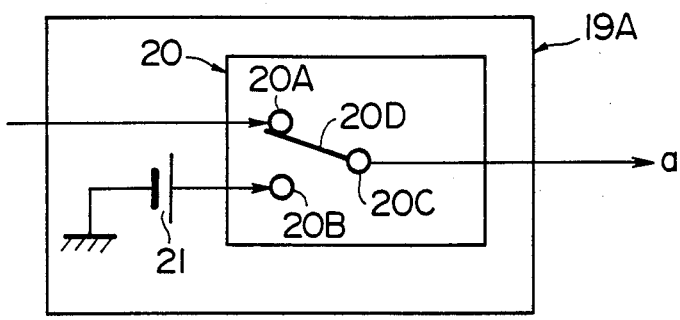
FIG. 2 is a view showing an exemplary configuration of a switching circuit employed in the system shown in FIG. 1.

First referring to FIGS. 1 and 2, the nuclear reactor safety control safeguard system according to an embodiment of the invention is composed of four signal processing channels 25A to 25D each including one signal processor, one switching circuit and one diagnosis circuit. (By way of example, the signal processing channel 25A comprises a signal processor 1, a switching circuit 19A and a diagnosis circuit 22A.) In each of the signal processing channels, the signal processor is connected to a number of sensors. More specifically, in the case of the channel 25A, the signal processor 1 is connected to the sensors $A_1$ to $N_1$. In the signal processing channel 25B, the signal processor 2 is connected to the sensor $A_2$ to $N_2$. In the signal processing channel 25C, the signal processor 3 is connected to the sensor $A_3$ to $N_3$. Finally in the signal processing channel 25D, the signal processor 4 is connected to the sensor $A_4$ to $N_4$. In this connection, it should be mentioned that a quartet of the sensors designated by a same alphabetic character (e.g. the sensors $A_1$, $A_2$, $A_3$ and $A_4$) are disposed at positions close to one another for measuring the same type of status quantity (hereinafter referred to as the same type status quantity). On the other hand, the sensors labeled with different alphabetic characters are destined to measure status quantities differing in nature from one another or the same status quantity at different locations (hereinafter referred to as the different types of status quantities). In the case of the illustrative embodiment of the invention under consideration, four sensors are provided for measuring one type status quantity. It should however be understood that one sensor may be provided for measuring one type status quantity and the sensor output signal may be inputted to the signal processors 1 to 4 of the four signal processing channels, respectively. The signal processors 1, 2, 3 and 4 fetch, respectively, the signals outputted from the associated sensors $A_1$ to $N_1$, $A_2$ to $N_2$, $A_3$ to $N_3$ and $A_4$ to $N_4$ provided in redundancy, and perform arithmetic operation on the fetched signals. When the results of the operations indicate that predetermined values are exceeded, the processing channels 25A to 25D produce trip signals a to d for scramming the nuclear power plant.

The switching circuit 19A may be composed of a change-over switch 20 and a power supply source 21, as exemplified by the circuit configuration shown in FIG. 2. The change-over switch 20 includes stationary contacts 20A and 20B, a stationary terminal contact 20C and a movable contact 20D closed constantly to the stationary contact terminal 20C. The power supply source 21 is connected to the stationary contact 20B. The switching circuits 19B, 19C and 19D are implemented in the same structure as the switching circuit 19A. The stationary contacts 20A of the switching circuits 19A to 19D are connected to the output terminals of the signal processors 1 to 4, respectively. So long as the signal processors 1 to 4 function in the normal state, the movable contacts 20D of the switching circuits 19A to 19D remain closed to the respective stationary contacts 20A.

Turning back to FIG. 1, the power circuit (constituting the switch means) 5 includes a first switch portion (also referred to as the first switch circuitry) 5A and a second switch portion (also referred to as the second switch circuitry) 5B. Each of the switch circuitries 5A and 5B is composed of four relays (or contactors). In the switch device or circuitry 5A, relays 8 and 9 are connected in series to each other, wherein a parallel connection of relays 10 and 11 is connected in series to the relay 9. The relay 8 is connected to the power supply source 6. In the second switch circuitry 5B, relays 12 and 13 are connected in series to each other, and a parallel connection of relays 14 and 15 is connected in series to the relay 13. The power supply source 7 is connected to the relay 12. The relays 8 to 15 have movable contacts 8A to 15A and stationary contacts 8B to 15B, respectively.

The relays 8 and 14 are connected to the output terminal contact 20C of the signal switching or changeover circuit 19A to receive the trip signal a for activating the relays 8 and 14. Similarly, the relays 9 and 15 are connected to the stationary contact terminal 20C of the signal switching circuit 19B for receiving the trip signal b serving for activation of these relays. In a similar manner, relays 10 and 12 are connected to the stationary contact 20C of the signal switching circuit 19C for receiving the trip signal c while the relays 11 and 13 are connected to the stationary contact terminal 20C of the signal switching circuit 19D for receiving the trip signal d serving for the relay activation. So long as the operation of the nuclear power plant is normal, the movable contacts 8A to 15A remain in the state closed to the stationary contacts 8B to 15B, respectively.

The common output terminal of the relays 10 and 11 (the output terminal of the switch circuitry 5A) is connected to an excitation coil 16 of a scramming electromagnet 18. On the other hand, the common output terminal of the relays 14 and 15 (the output terminal of the switch circuitry 5B) is connected to the other excitation coil 17 of the scramming electromagnet 18. The scramming electromagnet 18 is incorporated in a scramming electromagnetic valve 19.

In FIG. 1, reference characters 22A to 22D denote, respectively, abnormality diagnosis units for making determination as to the presence or absence of abnormality in the associated signal processors 1 to 4, respectively.

In the case of the embodiment of the invention now under consideration, the relays 8 to 15 of the power circuit 5 cooperate with the excitation coils 16 and 17 to constitute a 2-out-of-4 voting logic circuit. More specifically, the switch circuitry 5A, the excitation coil 16 connected thereto, the switch circuitry 5B and the excitation coil 17 constitute a sort of the 2-out-of-4 logic circuit.

Assuming now that the signal processors 1 to 4 which are normally operating produce the trip signals a to d (indicating some abnormal state in the plant), the movable contacts 8A and 14A are opened in response to the trip signal a, while the movable contacts 9A and 15A are opened in response to the trip signal b with the movable contacts 10A and 12A being opened in response to the trip signal c, the movable contacts 11A and 15A being opened in response to the trip signal d, resulting in both of the excitation coils 16 and 17 being deenergized. Upon deenergization of both of the excitation coils 16 and 17, the scramming electromagnet 18 is energized to open the scramming electromagnetic valve 19. Consequently, the control rod drive unit (not shown) operates to insert rapidly the control rods into the reactor core to scram the reactor.

Thus, it will be appreciated that the 2-out-of-4 logic circuit according to the illustrative embodiment of the present invention is so designed as to implement the 2-out-of-4 voting function with preference being put to "0" in the sense that the movable contacts of the relays 8 to 15 are opened in response to the signal input of logic "0".

In the case of the instant embodiment, it is assumed that the signal scramming electromagnetic valve 19 is employed. However, it should be understood that the concept of the present invention embodied in the instant embodiment can be equally applied to such arrangement in which a plurality of scramming electromagnetic valves 19 are provided and the power circuits 15 are correspondingly connected to the scramming electromagnetic valves 19, respectively, wherein the output signals of the switching circuits 19A to 19D are applied in parallel to the power circuits, respectively, to thereby bring about the scramming operation. Additionally, although it has been described that the scramming electromagnetic valve 19 to be driven is equipped with the pair of excitation coils in the arrangement shown in FIG. 1, the concept of the invention can be also applied to the case where two scramming electromagnetic valves each having one excitation coil are connected in series to each other. It should be added here that the scramming electromagnetic valve is provided in an air pipe for actuating pneumatically an open/close valve disposed on the exit side of a scramming accumulator of the control rod drive unit.

Turning to FIG. 1, energization and deenergization of the excitation coil 16 are controlled by the switch circuitry 5A while energization and deenergization of the excitation coil 17 is controlled by the switch circuitry 5B. In this conjunction, when the signal effective to set the excitation coil 6 to the deenergized state is represented by A with the signal effective for deenergizing the excitation coil 17 by B, the following relations apply valid between these signals A and B.

$$A = ab(c+d) \quad (1)$$

$$B = dc(a+d) \quad (2)$$

When the scram signal, applied to the scramming electromagnetic valve 19 is represented by Z, this signal is given by $$Z = A + B \quad (3)$$

By substituting the expressions (1) and (2), the expression (3) can be rewritten as follows:

$$Z = abc + bcd + cda + dab \quad (4)$$

From the expression (4), it is apparent that when any two of the trip signals a, b, c and d are logic "0", then the scram signal Z assumes always logic "0" even when the other trip signals are logic "1". Thus, there can be realized the nuclear reactor safety control safeguard system which is operative based on the 2-out-of-4 logic with preference or priority put to the logic level "0". Parenthetically, the number of the relays incorporated in the power circuit 5 is eight. However, since such arrangement is sufficient that two relays can be operated by one trip signal (e.g. the relays 8 and 14 are operated in response to the trip signal a), the power circuit can be realized with the same number (four) of relays as that of the conventional power circuit by employing the relay having pluralities of movable and stationary contacts, respectively. In other words, the 2-out-of-4, voting logic system can be implemented with a same amount of hardware resource as in the case of the hitherto known system. Further, by virtue of the 2-out-of-4 logic configuration, there can arise neither erroneous scram nor failure in the scramming operation even when malfunction should occur in one of the signal processor or in one of the switching circuits to cause the processor or the switching circuit to stick to the safety state (corresponding to the logic "1" state) or non-safety state (corresponding to the logic "0" state).

In the reactor safety control safeguard system of the arrangement described above, there may arise such a situation in which one of the signal processors has failed for some reason or has been disconnected for the purpose of maintenance. In such case, it is then possible to realize a 2-out-of-3 logic function with the remaining three processors, as will be described below.

The abovementioned advantageous feature can be attained by constituting one signal processing channel with the signal processor, the switching circuit and the abnormality diagnosis circuit. More specifically, it is assumed, by way of example, that the diagnosis circuit 22A having the input supplied with the status signal of the signal processor 1 decides on the basis of the input signal that some abnormality occurs in the associated signal processor 1. Then, the diagnosis circuit 22A produces a corresponding command signal which causes the movable contact 20D of the change-over switch 20 of the switching circuit 19A to be detached from the stationary contact 20A and closed to the stationary contact 20B. The power supply source produces a signal of logic "1". The relay supplied with the logic "1" signal from the power source 21 of the switching circuit maintains the movable contact in the closed state. In this way, the signal of logic "1" is produced by the change-over operation of the switching circuit connected to the signal processor which is in the abnormal state, whereby the 2-out-of-3 logic can be realized with the other three signal processors operating normally. The movable contact 20D of the change-over switch 20 of the switching circuit is constantly in contact with the stationary contact 20A, so long as the signal processor to which the aforementioned switching circuit is connected operates normally. The switching circuit is so arranged that when abnormality occurs in the operation of the associated signal processor which may produce a false trip signal to the power circuit 5, the movable contact 20D of the switching circuit is closed to the stationary contact 20B, whereby the signal of logic "1" is forcibly supplied to the power circuit 5. The change-over switch 20 may be controlled through manipulation of operator (not illustrated) or automatically in response to the command issued by the diagnosis unit. It should be mentioned that the diagnosis unit may be realized by any appropriate circuit known heretofore (reference may be made, for example, to JP-A No. 59-51393 and U.S. patent application No. 402,053 filed Jul. 27, 1982).

Disconnection of the signal processor will now be described in conjunction with the processor 1, by way of example. When the signal processor 1 assumes the abnormal state, the diagnosis unit issues a command signal, in response to which the movable contact 20D of the change-over switch 20 of the switching circuit 19A is changed over from the stationary contact 20A to the stationary contact 20B. At the moment the movable contact 20D is changed over to the stationary contact 20B from the stationary contact 20A, chattering will take place in the possibility the change-over switch 20, resulting in that the output signal appearing at the terminal 20C may vary from logic "0" to "1" and vice versa. However, since the 2-out-of-4 logic configuration is realized by the power circuit 5 and the excitation coils 16 and 17, the nuclear reactor will never be erroneously scrammed due to the chattering. The voltage value of the power source 21 to which the stationary contact 20B is connected is thus outputted as the logic "1" signal. Consequently, the signal a outputted from the switching circuit 19A assumes the logic level "1". By placing the value of this signal a into the expression (4), the scramming signal Z can be given by $$Z = bc + cd + db \quad \ldots \quad (5)$$

As will be seen from the above expression (5), the output signal of the switching circuit 19A belonging to the signal processing channel 25A is forcibly caused to assume the logic "1" level upon disconnection of the signal processor 1, as the result of which the 2-out-of-3 logic function can be realized for the output signals from the remaining signal processors 2, 3 and 4. This means that even when a failure occurs in one of the remaining three signal processors in the state in which one signal processor is disconnected, there can arise no such unwanted situation in which the nuclear reactor operating in the normal state might be erroneously scrammed or in which the nuclear power plant might be prevented from being scrammed upon occurrence of abnormality. The same holds true for the failure of one of the switching circuits connected to the remaining three signal processors as well as the failure in the relays connected to these switching circuits, respectively. In this manner, the condition for inhibiting the erroneous scram operation in the state in which one of the processors is disconnected as well as the single failure condition (i.e. maintenance of the scramming capability even in the case where malfunction occurs in one of the remaining processors) can be satisfied.

The foregoing description has been based on the assumption that the signal processor 1 shown in FIG. 1 is to be disconnected. However, the same applies valid for the disconnection of the other signal processor 2, 3 or 4. More specifically, when the signal processor 2 is disconnected, the switching circuit 19B is so controlled that the signal b assumes logic "1". Then, from the expression (4), the scram signal Z is given by $$Z = ac + cd + da \quad (6)$$

When the signal processor 3 is to be disconnected, the switching circuit 19C is so controlled that the signal c assumes the logic level "1". Then, from the expression (4), the scram signal Z is given by $$Z = ab + bd + da \quad (7)$$

Finally, when the signal processor 4 is disconnected, the switching circuit 19D is so controlled that $d = "1"$. From the expression (4), the scram signal Z is then given by $$Z = ab + bc + ca \quad (8)$$

In any case, when one of the signal processors is disconnected, the output signal of the relevant signal processing channel can be forcibly set to logic "1", whereby the 2-out-of-3 voting logic can be realized to enhance significantly the reliability of the reactor safety control safeguard system.

With the reactor safety control safeguard arrangement described above, there can be accomplished advantageous features such as mentioned below. Because the excitation coil 16 [first actuating means) and the excitation coil 17 (second actuating means) provided independent of each other for operating the scramming electromagnetic valve (the apparatus to be controlled) can cooperate with the power circuit 5 serving as the switch unit for operating the abovementioned excitation coils to constitute the 2-out-of-4 logic circuit, the structure of the switch unit (power circuit 5) can be significantly simplified, which in turn contributes to enhancement of the reliability of the safety control safeguard system for the nuclear reactor. Additional advantage may be seen in that the 2-out-of-4 logic configuration can be realized without need for modifying the arrangement of the existing electromagnetic valve having two excitation coils or the one having one excitation coil in the operating nuclear plant. Besides, when one of the four channel signal processors is disconnected due to failure or for the maintenance purpose, the 2-out-of-4 logic configuration is rearranged to the 2-out-of-3 logic which can positively prevent the safeguard system from operating erroneously or from remaining inoperative. Thus, there has been provided a nuclear reactor safety control safeguard system which can enjoy remarkably improved reliability.

Since the power circuit 5 of the safety control safeguard system shown in FIG. 1 is constituted by first and second switch circuitries 5A and 5B which operate independent of each other and in which no signal transfer takes place between them (i.e. the switch circuitries 5A and 5B have no common mode therebetween), the reliability of the switch unit (power circuit 5) can be improved, eventually contributing to a further improvement in the reliability of the reactor safety control safeguard system as a whole. Thus, there has been provided according to the embodiment of the invention described above a safety control safeguard system which comprises the signal processing channels 25A, 25B, 25C and 25D disposed in parallel with one another, the switch unit including the switch circuitry 5A composed of a series connection of the relays 8 and 9 and a parallel connection of the relays 10 and 11 which is connected in series to the series connection of the relays 8 and 9 and the switch circuitry 5B composed of a series connection of the relays 12 and 13 and a parallel connection of the relays 14 and 15 which is connected in series to the serially connected relays 12 and 13, and the excitation coils 16 and 17 connected, respectively, to the output terminals of the switch circuitries 5A and 5B, wherein either one of the relays 8 and 9 is opened in response to the trip signals outputted by two of the four signal processing channels while either one of the relays 12 and 13 is opened in response to the trip signals outputted by the remaining two signal processing channels, and wherein the trip signals outputted from the first mentioned two signal processing channels are effective to open the relays 14 and 15, respectively, with the trip signals outputted from the remaining two signal processing channels being effective to open the relays 10 and 11, respectively, whereby the nuclear reactor safety control safeguard system can be extremely simplified in the structure while the reliability of operation of the system can be significantly improved because of absence of any common mode between the switch circuitries 5A and 5B. In this connection, it will be seen that the switch circuitry connected to one excitation coil is constituted by four relays.

Since each signal processing channel includes the switching circuit, the signal processor suffering from any abnormality or the signal processor which is to undergo maintenance procedure can be easily disconnected from the nuclear reactor safety control safeguard system, whereby the latter can be protected against any adverse influence otherwise possibly exerted by the signal processor to be disconnected.

By virtue of provision of the abnormality diagnosis unit, the presence or absence of abnormality in the signal processors can be constantly monitored.

Figure 3:
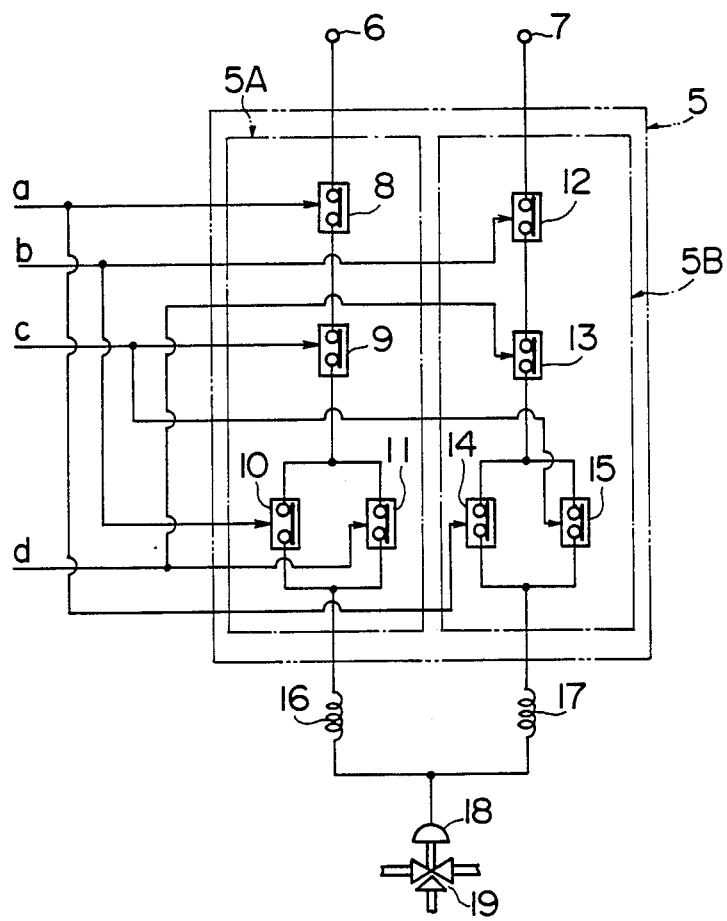

FIGS. 3 and 4 show other embodiments of the invention which are primarily directed to the circuit configurations around the power circuit. The nuclear reactor safety control safeguard systems according to the embodiments shown in FIGS. 3 and 4 differ from the one described in the foregoing in respect to the manner in which the relays and the switching circuits are interconnected, but the other structural arrangement including those portions not shown remain same as in the case of the embodiment shown in FIG. 1. In any case, the power circuit 5 and the excitation coils 16 and 17 cooperate to realize the 2-out-of-4 voting logic function.

First, the embodiment shown in FIG. 3 will be considered. The individual relays of the switch circuitries 5A and 5B and the associated switching circuit are connected in the manner mentioned below. The relays 9 and 15 are connected to the output terminal 20C of the switching circuit 19C for receiving, the trip signal c as the input thereto, and the realsy 10 and 12 are connected to the output terminal 20C of the switching circuit 19B for receiving the trip signal b. Thus, in the switch circuitry 5A, the relay 8 operates in response to the trip signal a, the relay 9 responds to the trip signal c in its operation, the relay 10 responds to the trip signal b, and the relay 11 reponds to the trip signal d. On the other hand, in the switch circuitry 5B, the relay 12 responds to the trip signal b in its operation, the relay 13 responds to the trip signal d, the relay 14 responds to the trip signal a, and the relay 15 responds to the trip signal c. Energization and deenergization of the excitation coil 16 are controlled by the switch circuitry 5A, while the excitation coil 17 is under control of the switch circuitry 5B in respect to its energization and deenergization. Consequently, the scram signal Z applied to the scramming electromagnetic valve 19 is given by $$Z = ac(b + d) + bd(a + c) \quad (9)$$
$$= abc + bcd + cda + dab \quad (10)$$

As will be seen from the expression (10), the scram signal Z is produced in accordance with the 2-out-of-4 logic as in the case of the scram signal defined by the expression (4) mentioned hereinbefore. Accordingly it will be readily appreciated that the embodiment shown in FIG. 3 can exhibit the actions and effects equivalent to those of the system shown in FIG. 1.

Next, the embodiment shown in FIG. 4 will be considered. The individual relays of the switch circuitries 5A and 5B and the switching circuit 19 are connected in the manner mentioned below. The relays 8 and 14 are connected to the output terminal (stationary contact) 20C of the switching circuit 19B for receiving the trip signal b as the input signal, while the relays 10 and 12 are connected to the output terminal (stationary contact) 20C of the switching circuit 19A for receiving the trip signal a. Accordingly, in the switch circuitry 5A, the relay 8 operates in response to the trip signal b, the relay 9 operates in response to the trip signal c, the relay 10 responds to the trip signal a and the relay 11 operates in response to the trip signal d. Similarly, in the switch circuitry 5B, the relay 12 responds to the trip signal a, the relay 13 responds to the trip signal d, the relay 14 responds to the trip signal b and the relay 15 responds to the trip signal c in their operations, respectively. Consequently, the excitation coil 16 is controlled by the switch circuitry 5A with respect to its energization and deenergization with the excitation coil 17 being controlled by the switch circuitry 5B. Accordingly, the scram signal Z applied to the scramming electromagnetic valve 19 is given by $$Z = bc(a + d) + ad(b + c) \quad (11)$$
$$= abc + bcd + cda + dab \quad (12)$$

As is apparent from the expression (12), the scram signal Z is produced in accordance with the 2-out-of-4 voting logic as in the case of the signal Z defined by the expression (4) mentioned hereinbefore. Thus, it will be appreciated that the system shown in FIG. 4 can exhibit advantageous actions and effects equivalent to those of the system shown in FIG. 1.

FIG. 5 shows another embodiment of the present invention applied to a reactor main steam isolating system which is one of the nuclear reactor safety control systems. In particular, this figure shows a circuit arrangement of the power circuit generally denoted by reference numeral 26 and associated parts. As is known in the art, the reactor main steam isolating system is employed for interrupting the flow of main steam supplied from a nuclear reactor through operation of an electromagnetic valve 29.

The reactor main steam isolating system according to the illustrative embodiment shown in FIG. 5 differs from the system shown in FIG. 1 in that the relays 8 and 12 of the switch circuitries 5A and 5B are connected to each other at the respective input ends and then connected to a single power supply source 28, while the output ends of the switch circuitries 5A and 5B are connected together, whereby the power circuit 26 is implemented in the form of a 2-out-of-4 logic circuit. The junction between the output ends of the switch circuitries 5A and 5B is connected to one excitation coil 27 of the electromagnet 18 for the electromagnetic valve 29. When a signal for setting the excitation coil 27 to the deenergized state (this signal is the same as the one of operating the electromagnetic valve 29) is represented by Y, this signal Y is given by $$Y = ab(c + d) + cd(a + b) \quad (13)$$
$$= abc + bcd + cda + dab \quad (14)$$

As will be seen from the expression (14), the signal Y is also produced in accordance with the 2-out-of-4 logic function similarly to the signal defined by the expression (4). It will thus be appreciated that the embodiment shown in FIG. 5 performs operation identical with that of the system shown in FIG. 1. Further, it should be mentioned that the switch circuitries 5A and 5B shown in FIG. 5 may be replaced by the switch circuitries 5C and 5D shown in FIG. 3 or by the switch circuitries 5E and 5F shown in FIG. 4.

When one of the signal processors is disconnected by controlling the switching circuit connected to the output side of the signal processor so that the logic "1" signal is produced, the other signal processor remaining connected are automatically rearranged to the 2-out-of-3 logic configuration, whereby very high reliability of the system can be assured.

It will be readily understand that the amount of hardware resource as required is substantially same as in the case of the hitherto known system.

Figure 6:
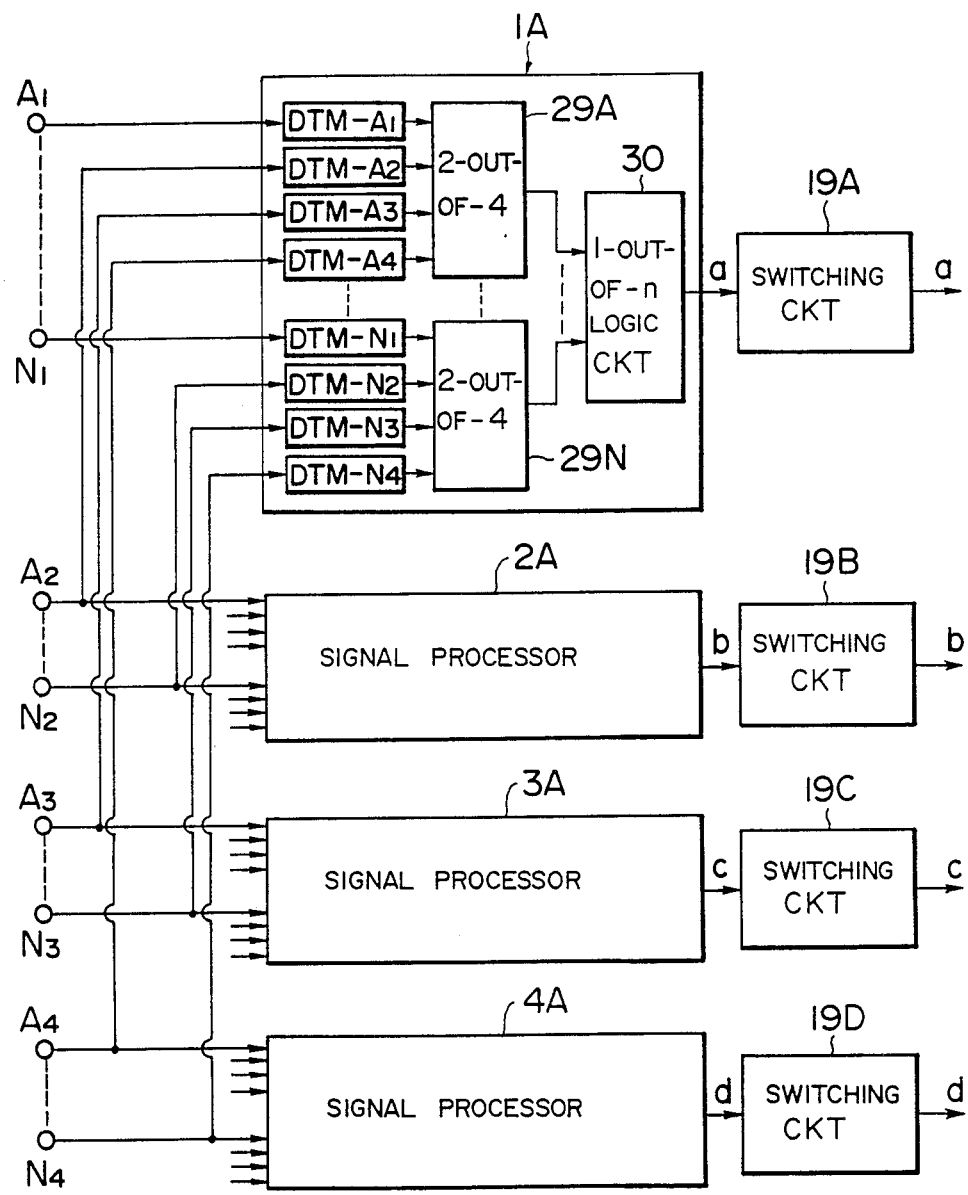

FIG. 6 shows a reactor safety control safeguard system according to still another embodiment of the present invention. This embodiment differs from the one shown in FIG. 1 in that the signal processors 1 to 4 are replaced by processors 1A, 2A, 3A and 4A, respectively, wherein the output signals of the sensors $A_1$ to $A_4, \ldots, N_1$ to $N_4$ are all applied to each of the processors 1A, 2A, 3A and 4A which are constituted by microprocessors, respectively. The power circuit to which the output signals of the switch circuitries 19A, 19B, 19C and 19D are inputted is implemented in the same circuit configuration as the one shown in FIG. 1. The power circuit of the embodiment shown in FIG. 6 is also destined to apply a scram signal to the excitation coils 16 and 17 of the electromagnetic 18 for the scramming electromagnetic valve.

The signal processor 1A includes digital trip modules DTM-N4 connected to the sensors $A_1$ to $A_4, \ldots, N_1$ to $N_4$, respectively. The digital trip modules DTM-N4 are connected to the sensors $N_1$ to $N_4$ serving for measuring a same type status quantity, while the digital trip modules DTM-N1 to DTM-N4 are connected to the sensors $N_1$ to $N_4$ for measuring another same type status quantity. The four digital trip modules having a same type status quantity inputted thereto (e.g. the digital trip modules DTM-A1 to DTM-A4) are set into the group. Accordingly, the number of groups each constituted by the four digital trip modules corresponds to the number of the different type status quantities to be measured. For each of the groups, a 2-out-of-4 logic circuit is provided, wherein the output ends of the four digital trip modules belonging to one group are connected to one 2-out-of-4 logic circuit. More specifically, the digital trip modules DTM-A1 to DTM-A4 are connected to the 2-out-of-4 logic circuit 29A, the digital trip modules DTM-N1 to DTM-N4 are connected to the 2-out-of-4 logic circuit 29N and so forth. Each of the 2-out-of-4 logic circuits 29A, ..., 29N may be constituted, for example, by the power circuit 26 shown in FIG. 5. The number of the 2-out-of-4 logic circuits incorporated in one signal processor is equal to n in the case of the embodiment under consideration. The n 2-out-of-4 logic circuits 29A, ..., 29N belonging to the signal processor 1A are connected to a 1-out-of-n logic circuit 30. The other signal processors 2A, 3A and 4A are also implemented in the identical circuit configuration with the signal processor 1A. The 1-out-of-n logic circuits 30 of the signal processors 1A to 4A are connected to the associated switching circuitries 19A, 19B, 19C and 19D, respectively, which in turn are connected to the individual relays of the power circuit as in the case of the system shown in FIG. 1. Alternatively, the switching circuits may be connected to the relays of the power circuit in the manner illustrated in FIG. 3 or 4. Although the abnormality diagnosis unit is omitted from illustration in FIG. 6, it should be noted that each of the signal processing channels in the system according to the embodiment under consideration is also composed of the signal processor, the switching circuit and the abnormality diagnosis unit.

Each digital trip module of each signal processor receives the status quantity signal outputted by the associated sensor and produces a trip signal when the sensor signal exceeds a predetermined value. Each of the 2-out-of-4 logic circuits incorporated in the processor produces the trip signal when at least two of the four digital trip modules belonging to one associated group outputs the trip signals. On the other hand, the 1-out-of-n logic circuit 30 produces in the trip signal (i.e. trip signal a, b, c, or d) when at least one of n 2-out-of-4 logic circuits 26A to 26N outputs the trip signal. The trip signals a, b, c, and d are effective to open the associated relays of the power circuit to deenergize the excitation coils 16 and 17 as in the case of the embodiment shown in FIG. 1. Consequently, the electromagnet 18 becomes operative to open the scramming electromagnetic valve 19 for scramming the nuclear reactor.

The embodiment shown in FIG. 6 can exhibit same effects as those of the system shown in FIG. 1. Additionally, since the 2-out-of-4 logic circuits are employed in the signal processors 1A to 4A, the latter can enjoy high reliability.

In a version of the system shown in FIG. 6, the digital trip modules DTM-A1 to DTM-A4, ..., DTM-N1 to DTM-N4 may be separated from the associated signal processors 1A, 2A, 3A and 4A and constituted by microprocessors which differ from those constituting the signal processors. In that case, the digital trip modules provided in the same number as those shown in FIG. 6 may be constituted by individually separated microprocessors and disposed in the vicinity of the associated signal processors, respectively. Each of the signal processors includes the 2-out-of-4 logic circuits 29A, ..., 29N and the 1-out-of-n logic circuit 30. This modified system provides substantially same advantageous effects as those attainable in the system shown in FIG. 6.

Figure 7:
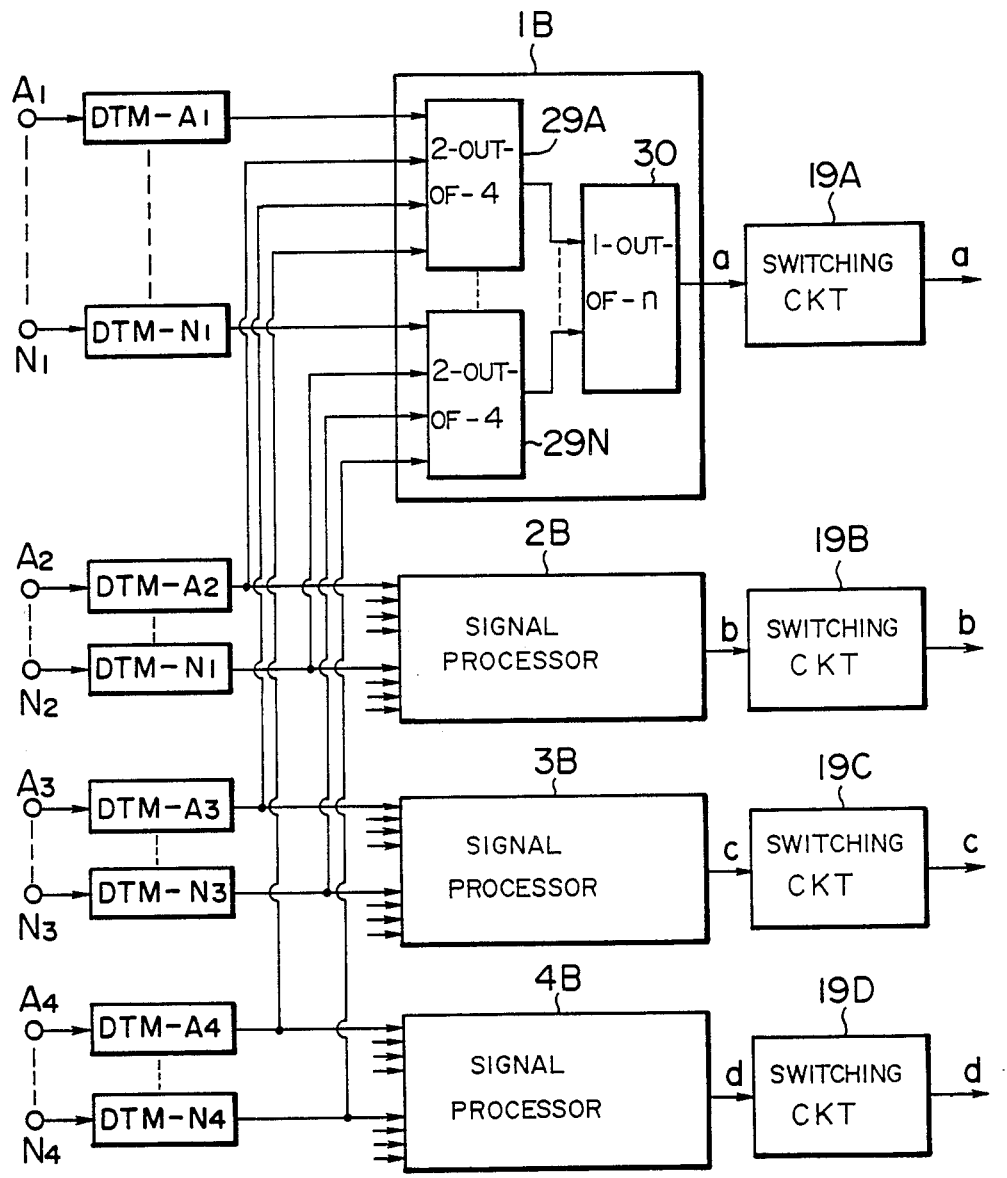

FIG. 7 shows another modification of the system shown in FIG. 6. In the case of this modified system, the digital trip modules DTM-A1 to DTM-A4, ..., DTM-N1 to DTM-N4 are provided separately from the associated signal processors and disposed in the vicinity of the associated sensors $A_1$ to $A_4, \ldots, N_1$ to $N_4$ to be connected thereto, respectively. The digital trip module DTM-A1 to DTM-A4, ..., DTM-N1 to DTM-N4 are constituted by discrete microprocessors, respectively. The digital trip modules DTM-A1 to DTM-A4, ..., DTM-N1 to DTM-N4 are provided in the same number as the sensor groups $A_1$ to $A_4, \ldots, N_1$ to $N_4$ and thus reduced in number to ¼ of the number of the digital trip modules employed in the system shown in FIG. 6 as well as the aforementioned version thereof. The signal processor 1B in the system shown in FIG. 7 is constituted by a microprocessor and incorporates the 2-out-of--4 logic circuits 29A, ..., 29N and a 1-out-of-n logic circuit 30. Each of the other signal processors 2B, 3B and 4B is also of the same circuit configuration as the signal processor 1B. The other circuit arrangement concerning the output side of the individual signal processors is same as that of the system shown in FIG. 6.

In contrast to the system described hereinbefore in conjunction with FIG. 6 and others in which the output signal of any given one sensor is divided so as to be inputted to the digital trip modules associated with the four signal processors, respectively, the output of any given one of the digital trip module is divided so as to be inputted to one 2-out-of-4 logic circuit incorporated in each of the four signal processors 1B, 2B, 3B and 4B in the case of the system shown in FIG. 7.

The system shown in FIG. 7 can assure similar effects to those of the system shown in FIG. 6. Besides, the embodiment shown in FIG. 7 can exhibit novel effects such as mentioned below. In most cases, the sensor signal is in the form of a current signal. Consequently, when the output of one sensor is branched into four channels, it is required that the four channel wires necessitated by the division of the sensor output be wound in loop, involving thus complicated wiring. However, in the case of the system shown in FIG. 7, the output of one sensor is not divided or branched but the output of one digital trip module to which the one sensor output is applied is branched into four channels. Consequently, the loop winding of the wiring conductors is not required on the output sides of the sensors and the digital trip modules, whereby the wiring can be significantly simplified. This arrangement is allowed because the output of the digital trip module assumes the form of a voltage signal in addition to the nondivision of the sensor output. Additionally, since the number of the digital trip modules can be decreased considerably, the system shown in FIG. 7 can be realized in a very simplified structure.

Figure 8:
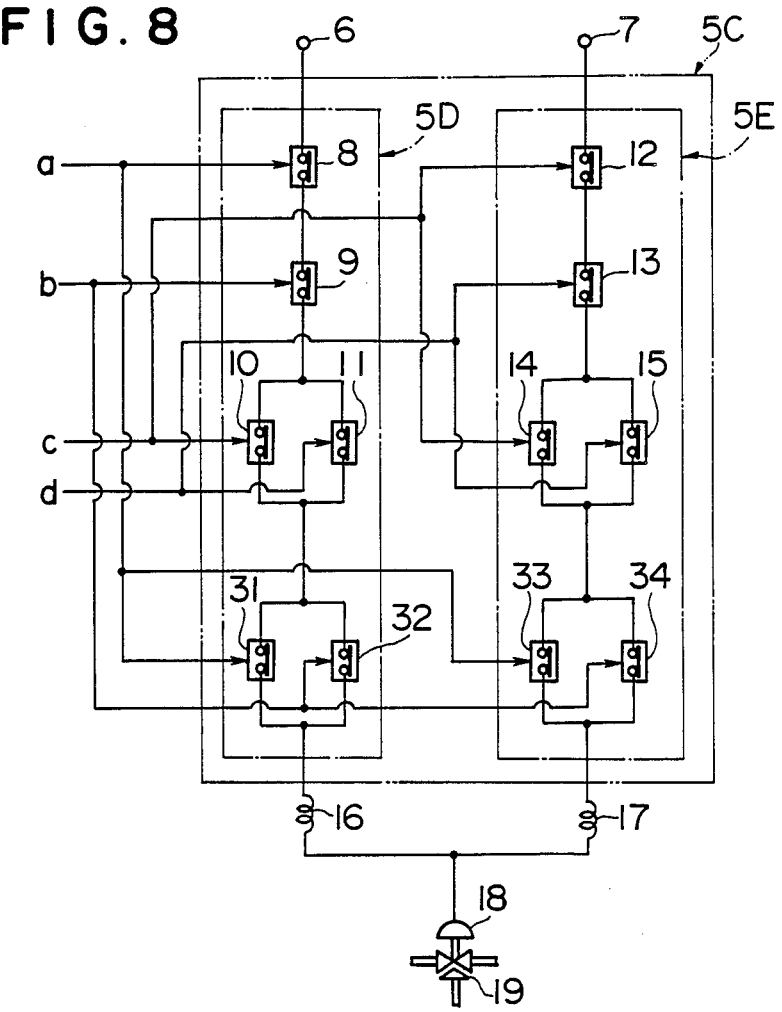
FIGS. 8 and 9 are views showing circuit configurations of a power circuit according to further embodiment of the invention.

FIG. 8 shows a further modification of the power circuit shown in FIG. 1 which has been developed on the basis of the various embodiments described in the foregoing.

Referring to FIG. 8, the power circuit 5C includes a switch circuitry 5D corresponding to the switch circuitry 5A of the power circuit 5 shown in FIG. 1 but added with relays 31 and 32 and a switch circuitry 5E corresponding to the one 5B shown in FIG. 1 except that relays 33 and 34 are additionally provided. More specifically, the input ends of the relays 31 and 32 connected in parallel are joined together and connected to the common output end of the relays 10 and 11 connected in parallel. The common output end of the relays 31 and 32 is connected to an excitation coil 16. The input ends of the relays 33 and 34 are also connected together while the output ends of the relays 14 and 15 are similarly connected together to form common output ends, respectively.

Although one shown in detail. the relays 8, 31 and 33 are connected to the switching circuit 19A of a signal processing channel 25A for receiving the trip signal a as the input signal. The relays 9, 32 and 34 are connected to the switching circuit 19B of the signal processing channel 25B for receiving the trip signal b. Further, the relays 10, 12 and 14 are connected to the switching circuit 19C of the signal processing channel 25C for receiving the trip signal c, while the relays 11, 13 and 15 are connected to the switching circuit 19D of the signal processing channel 25D for receiving the trip signal d as the input signal.

When the scram signal applied to the scramming electromagnetic valve 19 is represented by Z, the scram signal Z is given by $$Z = ab(c + d)(a + b) + cd(c + d)(a + b) \quad (15)$$
$$= ab(c + d) + cd(a + b)$$
$$= abc + bcd + cda + dab$$

As will be appreciated from the expression (15), the power circuit shown in FIG. 8 is implemented in a 2-out-of-4 logic configuration in which preference is put on logic "0" as in the case of the embodiments described hereinbefore. Since the switch circuitries 5D and 5E are realized with redundancy as described above, the reliability of the power circuit 5C can be further improved. By way of example, even when the relays 8 and 9 remain constantly in the "closed" state due to failure, the excitation coil 16 can be deenergized so far as the relays 30 and 31 remain normal. In other words, the scram function can be maintained regardless of the failure in the relays 8 and 9. The system shown in FIG. 8 can of course assure the advantageous effects similar to those of the system shown in FIG. 1. However, it must be admitted that the structure becomes more or less complicated when compared with that of the system shown in FIG. 1.

Description will now be made on a power circuit 5F shown in FIG. 9. This power circuit 5F comprises a pair of switch circuitries each of whic is implemented in the same configuration as the power circuit 26 shown in FIG. 5. The output end of the switch circuitry 26A (i.e. the output ends of the relays 10, 11, 14 and 15) is connected to the excitation coil 16, while the output end of the switch circuitry 26B (i.e. the output ends of the relays 42, 43, 46 and 47) is connected to the excitation coil 17. The switch circuitry 26B includes eight relays 40 to 47 which are interconnected in the similar relation to the relays 8 to 15 of the power circuit 26 shown in FIG. 5. The switch circuitry 26A also includes eight relays 8 to 15 which are interconnected in the same manner as the relays of the power circuit 26. The relays 8 and 12 are connected to a power supply source 6 with the relays 40 and 44 being connected to a power supply source 7.

The scram signal Z produced by the power circuit is given $$Z = ab(c + d) + cd(a + b) + ab(c + d) + cd(c + d) \quad (16)$$
$$= ab(c + d) + cd(a + b)$$
$$= abc + bcd + cda + dab$$

Figure 9:
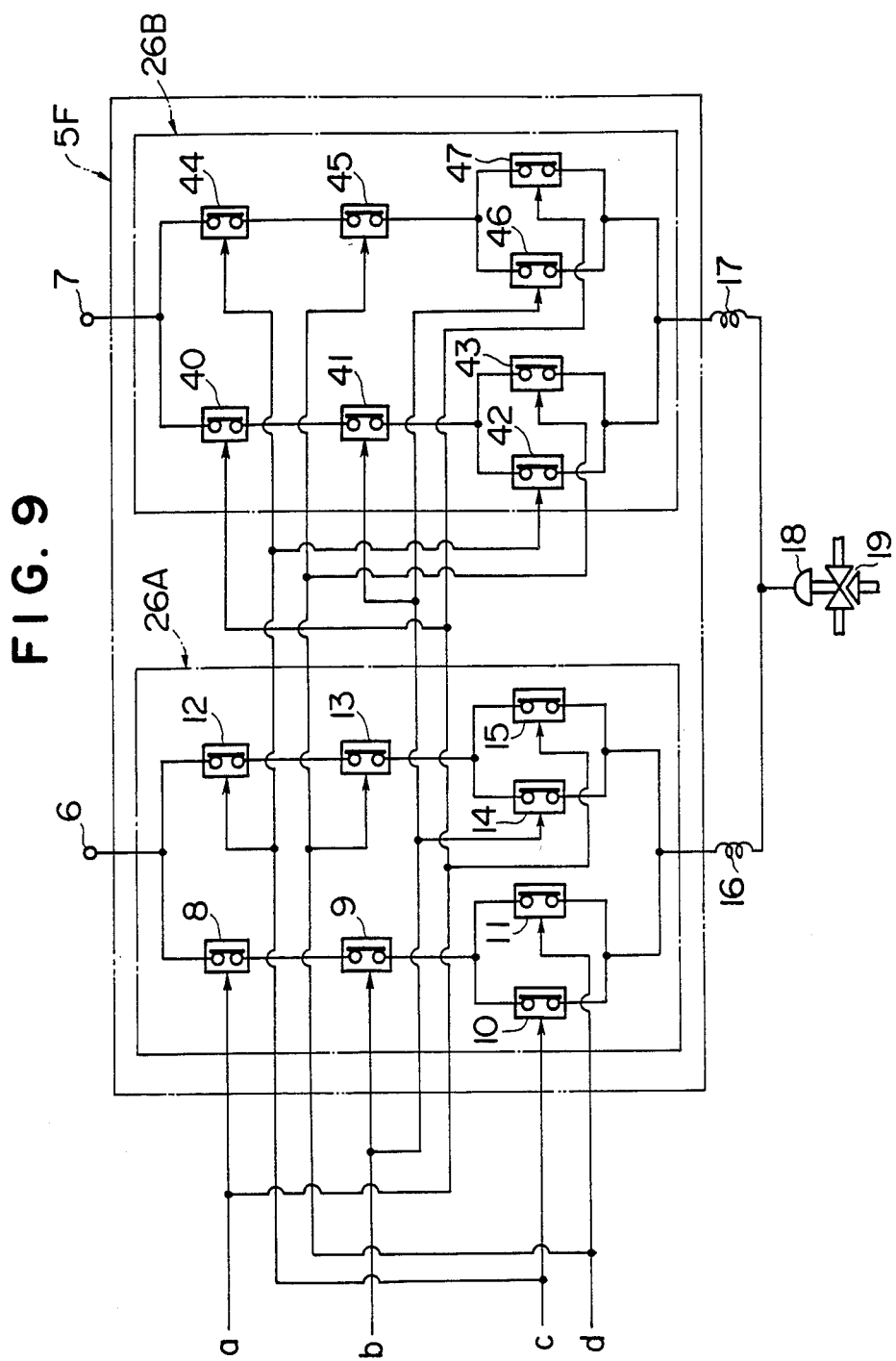

As can be seen from the expression (16), the power circuit 5F shown in FIG. 9 is realized as the 2-out-of-4 voting logic configuration with preference put on the logic "0" as in the case of the various embodiments described so far. This circuit 5F can assure a much improved reliability due to the circuit arrangement of the switch circuitries 26A and 26B imparted with great redundancy. Each of the switch circuitries 26A and 26B has no internal common mode, differing from the 2-out-of-4 logic circuit shown in the handbook, p. 264, Table 9.6 cited hereinbefore, and thus can enjoy a much simplified structure. More specifically, in the case of the 2-out-of-4 logic circuit disclosed in the abovementioned handbook, two relay groups connected in series are interconnected by a pair of wiring conductors at intermediate locations. In contrast, in the case of the switch circuitries 26A and 26B constituting the power circuit 5E, no intermediate interconnection is provided between a pair of relay groups (e.g. one group consisting of relays 40 to 43 and the other group of relays 44 to 47).

Figure 10:
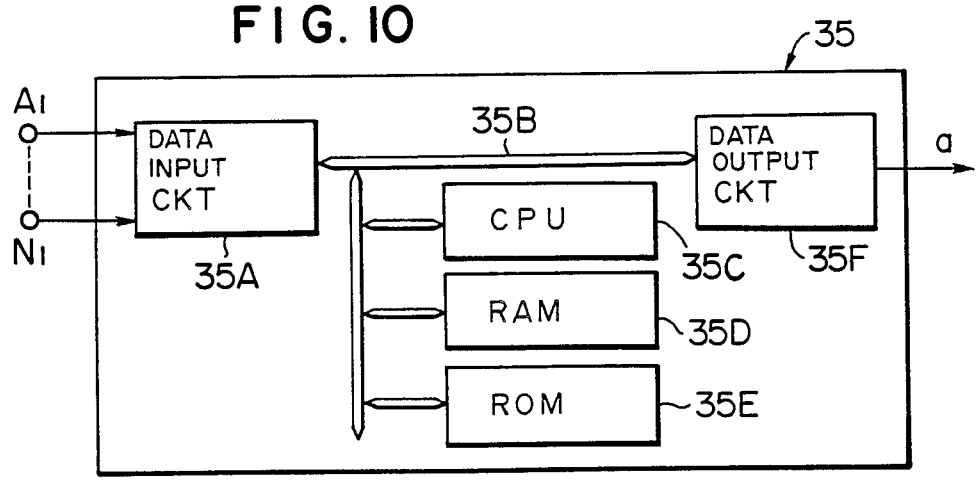
FIG. 10 is a view showing an arrangement of a signal processor according to another embodiment of the present invention.

Next, description will be made on another exemplary embodiment of the signal processor by referring to FIGS. 10 and 11. The signal processor 35 under consideration is constituted by a microprocessor including a data input circuit 35A, a bus 35B, a CPU (central processing unit) 35C, a RAM (random access memory) 35D, a ROM (read-only memory) 35E and a data output circuit 35F. The data input circuit 35 having inputs connected to n types of sensors $A_1$ to $N_1$ is connected to the bus 35B which in turn is connected to the CPU 35C, the RAM 35D, the ROM 35 E and the data output circuit 35F, respectively. The ROM 35E stores therein processing procedure illustrated in FIG. 11. The CPU 35C executes operation in accordance with the processing procedure stored in the ROM 35E. The RAM 35D stores therein the data supplied from the data input circuit 35A as well as the data resulting from the operation of the CPU 35C. Each of the signal processors 1 to 4 shown in FIG. 1 may be constituted by this signal processor 35.

Next, a processing routine for producing the trip signal in accordance with the processing procedure illustrated in FIG. 11 will be described on the assumption that the signal processor 35 is employed as the processor 1 of the system shown in FIG. 1. Measurement data signals produced by the sensors $A_1, \ldots, N_1$ are written in the RAM 35D by way of the data input circuit 35A. The CPU 35C reads the processing procedure illustrated in FIG. 11 from the ROM 35E. In a step 48 of the processing procedure, the CPU 35C reads the measurement data from the RAM 35D. Each measurement data as read into the CPU 35C is compared with a predetermined value (a preset scram value) at a step 49. Subsequently, decision is made at a step 50 as to whether there is the measurement data which exceeds the predetermined value. If the result of comparison is negative (NO), the CPU 35C produces the signal a of logic "1" at a step 51. Otherwise, the CPU 35C produces the signal a of a step 52. The value of the signal a thus produced is once stored in the RAM 35D and thereafter transferred to the switching circuit 19A through the data output circuit 35F. The processing at the steps 48 to 50 and 51 or step 48 to 50 and 52 is repeated for each measurement data as inputted. When the signal processor is employed as the signal processors 2, 3 and 4 shown in FIG. 1, the output signal a resulting from the processing at the steps 51 and 52 should read the output signals b, c and d, respectively.

Another example of the processing procedure is illustrated in FIG. 12 which differs from the one shown in FIG. 11 in that the step 54 is replaced by the step 50 and that the step 53 is newly provided. This processing procedure can be advantageously applied to the case where the measurement data obtained from the sensors $A_1$ to $A_4, \ldots, N_1$ to $N_4$ (i.e. all the different types of measured status quantity signals) are inputted to one signal processor each in quadruplet. The signal processor 35 to which this processing procedure can be applied corresponds to the signal processor 1A (or 2A, 3A or 4A) of the system shown in FIG. 6. The following description is directed to the portions of the processing procedure which differ from those illustrated in FIG. 11. At a step 53, it is decided whether at least two of the four same type measurement data subjected to the comparison at the step 49 exceeds the predetermined value (decision based on the 2-out-of-4 voting logic) and produces the trip signal (of logic "0") when the predetermined value is exceeded. More specifically, at the step 53, decision is made for every measurement data of n different types as to whether at least two same type measurement data exceeds the predetermined value. Subsequently, execution proceeds to a step 54 where decision is made as to whether at least one of the results of decision made for the different type measurement data on the basis of the 2-out-of-4 logic is logic "0" or not. When the decision made at the step 54 results in "NO", the processing indicated at a step 51 is executed. Otherwise, the processing indicated at a step 52 is performed.

The nuclear reactor safety control safeguard system differing from the one shown in FIG. 1 in that the signal processors described above in conjunction with FIGS. 10 and 12 are employed can enjoy advantageous effects similar to those attainable with the system shown FIG. 1. Besides, because each processor is constituted by a microprocessor, the system can be realized in a compact structure, to further advantage. The embodiment described above in conjunction with FIG. 12 can assure substantially same effects as those attainable with the system shown in FIG. 6.

As will now be understood, the structure of switch apparatus can be simplified while the reliability of the safety control safeguard system can be significantly improved according to the present invention.

We claim:

1. A control system, comprising:
   sensors installed in a quadruple array;
   first, second, third and fourth signal processing channels provided in parallel and each including signal processing means for receiving output signals from said sensors for producing a trip signal;
   a pair of actuating means operable independent of each other;
   an apparatus controlled through operation of said pair of actuating means; and switch means operatively connected to said first, second, third and fourth processing channels for activating said two actuating means in response to application of trip signals produced by at least two of said signal processing channels;
   wherein said signal processing means includes:
   (a) decision means for receiving status quantity signals produced by said sensors to determine wheher said status quantity signals exceed a predetermined value;
   (b) 2-out-of-4 logic means providing in a number n equal to that of said sensors for producing the status quntity of different types and receiving a first output signal from said decision means which corresponds to four same type status quantity signals; and
   (c) 1-out-of-n logic means having inputs supplied with second output signals from all of said 2-out-of-4 logic means to produce said trip signal when at least one of said second output signal exceeds the predetermined value.

2. A control system, comprising:
   sensors installed in a quadruple array;
   first, second, third and fourth signal processing channels provided in parallel and each including signal processing means for receiving output signals from said sensors for producing a trip signal;
   a pair of actuating means operable independent of each other;

an apparatus to be controlled through operation of said pair of actuating means; and switch means operatively connected to said first, second, third and fourth processing channels for receiving said trip signal produced by said signal processing channels and constituting in cooperation with said two actuating means a 2-out-of-4 logic circuit.

3. A control system according to claim 2, wherein said switch means includes a plurality of switch elements which cooperate with said two actuating means to constitute said 2-out-of-4 logic circuit.

4. A control system according to claim 2, wherein said signal processing means includes:

decision means for receiving status quantity signals produced by said sensors to determine whether said status quantity signals exceed a predetermined value;

2-out-of-4 logic means provided in a number n equal to that of said sensors for producing the status quantity signals of different types and each receiving a first output signal from said decision means which corresponds to four same type status quantity signals; and 1-out-of-n logic means having input supplied with second output signals from all of said 2-out-of-4 logic means to produce said trip signal when at least one of said second output signal exceeds the predetermined value.

5. A control system, comprising:

sensors installed in a quadruple array;

first, second, third and fourth signal processing channels provided in parallel and each including a microprocessor for receiving output signals from said sensors for producing a trip signal;

a pair of actuating means operable independent of each other;

an apparatus to be controlled through operation of said pair of actuating means; and switch means operatively connected to said first, second, third and fourth processing channels for activating said two actuating means in response to application of trip signals produced by at least two of said signal processing channels;

wherein said microprocessor is connected to receive as inputs thereto the output signals from four of said sensors, which sensors include means for producing same type status quantity signals and said trip signal when at least two of said four same type status quantity signals exceed a predetermined value.

6. A control system according to claim 5, wherein said microprocessor comprises means for producing said trip signal when at least one of the output signals of said sensors exceeds a predetermined value.

7. A control system, comprising:

sensor installed in a quadruple array;

first, second, third and fourth signal processing channels provided in parallel and each including a microprocessor for receiving output signals from said sensor for producing a trip signal;

a pair of actuating means operable independent of each other;

an apparatus to be controlled through operation of said pair of actuating means; and switch means operatively connected to said first, second, third and fourth processing channels for receiving said trip signals produced by at least two of said signal processing channels, and constituting through cooperation with said two actuating means a 2-out-of-4 logic circuit.

8. A control system according to claim 7, wherein said microprocessor comprises means for producing said trip signal when at least one of the output signals of said sensors exceeds a predetermined value.

9. A control system according to claim 7, wherein said microprocesor is connected to receive as inputs thereto the output signals from four of said sensors, which sensors include means for producing same type statue quantity signals and said trip signal when at least two of said four same type status quantity signals exceed a predetermined value.

10. A control system, comprising:

sensors installed in a quadruple array;

first, second, third and fourth signal processing channels provided in parallel and each including signal processing means for receiving output signals from said sensors for producing a trip signal;

first and second actuating means operable independent of each other;

an apparatus to be controlled through operation of said pair of actuating means;

first switch means operatively connected to said first, second, third and fourth processing channels for activating said first actuating means in response to application of a trip signal produced by said signal processing channels; and second switch means operatively connected to said first, second, third and fourth processing channels for activating said second actuating means in response to application of a trip signal produced by said signal processing channels, wherein said first and second switch means and said first and second actuating means constitute a 2-out-of-4 logic circuit.

11. A control system according to claim 10, wherein said signal processing means includes:

decision means for receiving status quantity signals produced by said sensors to determine whether said status quantity signals exceed a predetermined value;

2-out-of-4 logic means provided in a number n equal to that of said sensors for producing the status quantity signals of different types and each receiving a first output signal from said decision means which corresponds to four same type status quantity signals; and 1-out-of-n logic means having inputs supplied with second output signals from all of said 2-out-of-4 logic means to produce said trip signal when at least one of said second output signals exceeds the predetermined value.

12. A control system, comprising:

sensors installed in a quadruple array;

first, second, third and fourth signal processing channels provided in paralle and each including signal processing means receiving output signals from said sensors for producing a trip signal;

first switch means including a circuit composed of a first switch element, a second switch element and a parallel connection of third and fourth switch elements which are connected in series to one another;

second switch means including a circuit composed of a fifth switch element, a sixth switch element and a parallel connection of seventh and eighth switch elements which are connected in series to one another;

first actuating means connected to the output end of said first switch means;

second actuating means connected to the output end of said second switch means and operable independent of said first actuating means;

an apparatus to be controlled through operation of said first and second actuating means;

wherein trip signals outputted from two of said signal processing channels are effective to open either one of said first and second switch elements, respectively, while trip signals outputted from the remaining two signal processing channels are effective to open either one of said fifth and sixth switch elements, respectively, said trip signals outputted from the first mentioned signal processing channels being further effective to open either one of said seventh and eighth switch elements, respectively, while the trip signals outputted from said remaining two signal processing channels are effective to open either one of said third and fourth switch elements, respectively.

13. A control system according to claim 12, wherein each of said first and second actuating means is constituted by an excitation coil, and said apparatus to be controlled is constituted by an electromagnetic valve provided with an electromagnet having said excitation coils.

14. A control system, comprising:
sensors installed in a quadruple array;
first, second, third and fourth signal processing channels provided in parallel and each including signal processing means for receiving output signals from said sensors for producing a trip signal and switching means connected to said signal processing means;
a pair of actuating means operable independent of each other;
an apparatus to be controlled through operation of said actuating means; and
switch means operatively connected to said first, second, third and fourth processing channels for activating said two actuating means in response to application of trip signals produced by at least two said signal processing channels.

15. A control system, comprising:
sensors installed in a quadruple array;
first, second, third and foruth signal processing channels provided in paralle and each including signal processing means for receiving output signals from said sensors for producing a trip signal and switching means connected to said signal processing means;
a pair of actuating means operable independent of each other;
an apparatus to be controlled through operation of said pair of actuating means; and
switch means operatively connected to said first, second, third and fourth processing channels for receiving said trip signal produced by said signal processing channels and constituting in cooperation with said two actuating means a 2-out-of-4 logic circuit.

16. A control system, comprising:
sensors installed in a quadruple array;
first, second, third and fourth signal processing channels provided in parallel and each including (a) signal processing means for receiving output signals from said sensors and for producing a trip signal and (b) switching means connected to receive said trip signal from said signal processing means in the signal processing channel;
a pair of actuating means operable independent of each other;
an apparatus to be controlled through operation of said pair of actuating means; and
switch means having switch elements respectively connected to said first, second, third and fourth processing channels via the respective switching means thereof for activating said two actuating means in response to application of trip signals produced by at least two of said signal processing channels;
wherein each of said signal processing channels includes means for detecting an abnormality in the operation of the signal processing means of the signal processing channel and for operating said switching means to disconnect said abnormal signal processing means from said switch means, and wherein said switching means in each signal processing channel includes means responsive to operation by said detecting means for producing an output to maintain a switch element of said switch means connected thereto in a closed state.

17. A control system, comprising:
sensors installed in a quadruple array;
first, second, third and fourth signal processing channels provided in parallel, each of said signal porcessing channels including signal processing means for receiving output signals from said sensors for producing a trip signal, switching means connected to said signal processing means and diagnosis means for deciding presence or absence of abnormality in said signal processing means to output an operation command to said switching means for causing said signal processing means to be disconnected when abnormality is present;
a pair of actuating means operable independent of each other;
an apparatus to be controlled through operation of said pair of actuating means; and
switch means operatively connected to said first, second, third and fourth processing channels for receiving said trip signal produced by said signal processing channels and constituting in cooperation with said two actuating means a 2-out-of-4 logic circuit.

18. A control system, comprising:
a plural types of sensors, each type of sensors being installed in a quadruple array;
first, second, third and fourth signal processing channels provided in parallel and each including a plurality of first microprocessors for receiving output signals from the associated sensors, respectively, for producing trip signals and a second microprocessor including a majority logic circuit receiving the output signals of said first microprocessors to output a trip signal;
a pair of actuating means operable independent of each other;
an apparatus to be controlled through operation of said pair of actuating means; and
switch means operatively connected to said first, second, third and fourth processing channels for receiving said trip signal produced by said signal processing channels and constituting in cooperation with said two actuating means a 2-out-of-4 logic circuit.

* * * * *